United States Patent Office 2,761,859
Patented Sept. 4, 1956

2,761,859

AQUEOUS SOLUBLE SALTS OF ERYTHROMYCIN

Charles E. Hoffhine, Jr., Waukegan Township, Lake County, Ill., assignor to Abbott Laboratories, North Chicago, Ill., a corporation of Illinois No Drawing. Application January 14, 1953,
Serial No. 331,323

3 Claims. (Cl. 260—210)

This invention relates to aqueous soluble salts of the antibiotic called erythromycin and to a process for preparing such salts. The application also relates to an injectible aqueous solution containing the soluble erythromycin salt of this invention.

Erythromycin is an antibiotic which is produced by a strain of Streptomyces erythreus which was isolated from a soil sample collected from the Philippine Islands. The antibiotic shows rather broad activity against bacteria and certain other microorganisms. It is a crystalline antibiotic having a basic nature and is soluble to the extent of about 2 to 4 mg./ml. in water. It is soluble in a number of organic solvents. It has a melting point of about 130° C. to 135° C. and an optical rotation $[\alpha]_D^{25}$ of about —78. Considerable data on the identification of the antibiotic is contained in Antibiotics and Chemotherapy, vol. 2, No. 6, pg. 281, (June 1952).

It is recognized that erythromycin is a very useful drug and that it would be desirable to administer the drug by injection. The erythromycin base is quite insoluble in water, however, and it can not, therefore, be injected intravenously for any practical purpose. Therefore, it is one of the objects of this invention to prepare a salt of erythromycin which will be soluble in aqueous medium in therapeutically desirable concentrations. The instability of solutions of erythromycin base in water is well known and even the small amount of erythromycin base which will dissolve in water loses its potency in a short time. It is another object of this invention to prepare a salt of erythromycin which will make high erythromycin activity in aqueous solution and will remain stable for a satisfactory period of time.

According to the invention, there is now provided a soluble salt of erythromycin which is the reaction product of erythromycin with lactobionic acid. Such a reaction product has been found to have a solubility in water of about 200 mg./cc. and an erythromycin activity of about 420 units/mg. The structural chemical formula for erythromycin is extremely complex and has not been identified at the present time. Hence, it is impossible to characterize the reaction product by describing it in the form of a chemical formula. Nevertheless, certain things are known about the reaction product which clearly identify it and are capable of distinguishing it from other materials.

The following example is presented in order to teach the details of the invention more clearly. It is not intended in any way to be a limitation on the invention. The parts are by weight unless otherwise specified.

Example I

A solution of erythromycin free base is prepared by dissolving 8.0 grams of erythromycin in 25 cc. of acetone. 4.0 grams of lactobiono-delta-lactone is dissolved in 25 cc. of water. The free lactobionic acid is formed in this solution and it has the molecular formula $C_{12}H_{22}O_{12}$.

The two previous described solutions are mixed and evaporated to a gummy residue. This residue is dissolved in 60 cc. of water and the solution is frozen and dried in vacuum by lyophilization. The dried residue of erythromycin lactobionate is a white amorphours powder and weighs 11.7 grams. The reaction product has an activity against B. subtilis of 420 units/mg. Its solubility in water is about 200 mg./cc. and the melting point of the white powdery reaction product is 145° C.–150° C. A carbon analysis of 53.17% was found as compared to the theoretical carbon content of 54.56%. Likewise a hydrogen analysis of 8.26% was obtained as compared to the theoretical 8.54%.

Erythromycin lactobionate prepared according to the preceding example is soluble in aqueous media such as distilled water and dextrose solution. Hence, any of the common non-ionic parenteral media may be used to solubilize the salt prior to injection. The reaction product is soluble in aqueous media in large enough concentrations to provide a therapeutically effective dose of erythromycin in a small volume of the aqueous media.

For example, the reaction product can be worked up into a pharmaceutical product by taking the aqueous solution of erythromycin lactobionate before it is frozen and sterilizing it by passing it through a Selas 03 filter. The filtrate is received into sterile vials in an amount calculated to give a certain desired dosage per cc. of reconstituted solution. The sterile solution is lyophilized and stoppered with a sterile stopper. In this form the erythromycin lactobionate salt will retain its acivity for an indefinite period. When it is desired to inject the erythromycin lactobionate a predetermined quantity of sterile aqueous media is inserted into the vial, as by the use of a syringe and needle. The vial is shaken until reconstituted solution is obtained and this solution is withdrawn from the vial into a syringe and may then be injected intravenously, subcutaneously, or intramuscularly in the usual manner.

The amount of erythromycin lactobionate which is filled into a vial is adjusted so that each cc. of reconstituted solution will contain a known amount of activity of erythromycin. For example, about 220 mg. of erythromycin lactobionate may be filled into a 2 cc. vial and reconstituted by the addition of 2 cc. of sterile aqueous liquid. Allowing for some losses, the reconstituted solution will contain about 60 mg. of erythromycin activity per cc., or in other words about 60,000 units of erythromycin activity per cc. It will be understood of course, that any size vial may be used in place of the 2 cc. vial just described and correspondingly larger or smaller quantities of erythromycin lactobionate will be employed. It will also be recognized that the number of units of erythromycin activity in a reconstituted solution can be adjusted at will up to the limit of solubility of the salt in the aqueous media.

Once the erythromycin lactobionate has been made into a reconstituted solution in the vial its stability is somewhat more limited than that of the dry powder. In any event the stability of the reconstituted solution of erythromycin lactobionate is far graeter than that of a solution of erythromycin free base.

Others may practice the invention in any of the numerous ways which may be suggested to one skilled in the art. It is intended that such practice of the invention is

I claim:
1. The process of preparing new and useful pharmaceutical substances which comprises mixing solutions of approximately equimolar proportions of erythromycin and lactobionic acid at ordinary temperatures, and separating the resulting water soluble white amorphous solid erythromycin lactobionate, from the reaction medium.

2. The white amorphous solid, erythromycin lactobionate, obtained by the process of claim 1.

3. A physiologically active pharmaceutical preparation comprising a substantially non-ionic injectable aqueous solution of the product of claim 2.

References Cited in the file of this patent
UNITED STATES PATENTS

| | | |
|---|---|---|
| 1,989,566 | Stoll et al. | Jan. 29, 1935 |
| 2,653,899 | Bunch et al. | Sept. 29, 1953 |